United States Patent
Greene

[11] Patent Number: 5,982,300
[45] Date of Patent: Nov. 9, 1999

[54] AIRPLANE SAFE TAKE-OFF ROTATION INDICATOR

[75] Inventor: Leonard M. Greene, Scarsdale, N.Y.

[73] Assignee: Safe Flight Instrument Corporation, White Plains, N.Y.

[21] Appl. No.: 08/143,754

[22] Filed: Nov. 1, 1993

[51] Int. Cl.[6] .................................................. G08B 21/00
[52] U.S. Cl. ..................... 340/959; 73/178 T; 340/963; 340/969; 701/15
[58] Field of Search .................................... 340/959, 963, 340/968, 969; 364/427, 428; 73/178 T; 701/14, 15, 16

[56] References Cited

U.S. PATENT DOCUMENTS

| | | | |
|---|---|---|---|
| 4,106,731 | 8/1978 | Bliss | 364/428 |
| 4,133,503 | 1/1979 | Bliss | 364/428 |
| 4,530,060 | 7/1985 | Greene | 364/428 |
| 4,594,592 | 6/1986 | Greene | 340/959 |
| 4,638,437 | 1/1987 | Cleary et al. | 340/959 |

OTHER PUBLICATIONS

*Introduction to Flight,* John D. Anderson, Jr., pp. 99–100, ©1978.

*Primary Examiner*—Brent A. Swarthout
*Attorney, Agent, or Firm*—Dougherty & Troxell

[57] ABSTRACT

A device for indicating that an airplane has reached a safe speed in the presence of headwinds for initiating take-off rotation. The device senses the true ground speed of the airplane and converts the true ground speed into an "indicated ground speed" in accord with the relationship between true air speed and indicated air speed for the airplane. The device subtracts the indicated ground speed from the indicated air speed of the airplane to determine the amount of the headwind and, whenever the headwind exceeds a preselected margin, the device increases the value of the safe minimum indicated air speed for initiation of take-off by any excess of the headwind over the preselected margin. The device then directs the flight director to initiate take-off rotation when the indicated air speed of the airplane equals or exceeds the adjusted minimum indicated air speed.

12 Claims, 2 Drawing Sheets

AIRPLANE SAFE TAKE-OFF ROTATION INDICATOR

BACKGROUND OF THE INVENTION a. Field of the Invention

This invention pertains to devices used to aid the pilot of an airplane in determining the point in the take-off roll of an airplane at which the pitch or attitude of the airplane safely may be rotated to begin take-off from the ground.

b. Description of the Prior Art

This invention is an improvement of the invention described in U.S. Pat. No. 4,594,592 ("592"). The specification of the "592" patent discloses a device which indicates when airplane rotation may be initiated to begin take-off. As pointed out in the "592" patent, air speed sensors and indicators have been used in the prior art to indicate when an airplane has attained a predetermined air speed that is deemed sufficient for safe rotation of the airplane for take-off. However, if part of the air speed is due to a headwind which decreases suddenly immediately after take-off, insufficient air speed may then remain for a safe continuation of the take-off. As a consequence, rather than depend only upon indicated air speed as an indication that a safe speed has been reached for rotation, a safer procedure is to use an air speed sensor combined with a ground speed sensor that determines the amount of the headwind and then adjusts the minimum air speed for take-off to higher values if the headwind exceeds a predetermined minimum.

The air speed of the airplane typically is measured by means of a Pitot tube located at an appropriate place on the fuselage of the airplane. The air speed indicated by such an instrument, which air speed is generally referred to as the "indicated air speed," differs from the actual, or true, air speed as a function of air density and compressible flow. The amount of the "lift" to the airplane that can be provided at take-off by the airflow over the airplane wings is a function of the dynamic air pressure. The dynamic air pressure is substantially the same as the pressure that is sensed by the Pitot tube and that is described in terms of an "indicated air speed." As a consequence the "indicated air speed", rather than the true air speed, normally is utilized for determining when take-off rotation may be initiated.

For a specific ambient air temperature and pressure, the ratio between indicated air speed and true air speed is a constant. This constant, however, is a function of both the ambient air temperature and pressure.

Prior to take-off the pilot of the airplane typically uses the temperature, loaded weight of the airplane and performance data for the airplane to determine from charts or other sources the minimum indicated air speed for safe airplane rotation to initiate take-off. In the "592" patent, the minimum indicated air speed, in effect, was reduced by an appropriate margin to determine the minimum safe ground speed for take-off rotation that would allow for a decrease in headwind just after take-off. As pointed out above, because of the dependence of indicated air speed upon ambient air temperature and pressure, the indicated air speed for take-off rotation may differ significantly from the corresponding true air speed required for take-off rotation. As a consequence, if the minimum actual or "true" ground speed for take-off rotation is determined simply in terms of the minimum indicated air speed less a specified margin of perhaps 5 to 10 knots, the actual or true minimum ground speed may differ from the true minimum air speed for take-off rotation by a substantially greater margin, thus providing less protection against a sudden decrease in headwind shortly after take-off.

SUMMARY OF THE INVENTION

The present invention utilizes ambient air pressure and temperature sensors to determine a conversion factor to convert the actual or true ground speed of the airplane into an "indicated ground speed" for the airplane. The conversion factor is the same as the conversion factor between the true air speed and the indicated air speed for the airplane under the same conditions. The present invention then provides an indication that take-off rotation may be initiated when both the minimum indicated air speed and the minimum "indicated ground speed" have been met or exceeded. The present invention subtracts the indicated ground speed from the indicated air speed to determine the amount of headwind that the airplane is experiencing during the take-off roll and adjusts the minimum value of indicated air speed for take-off if the headwind exceeds a preselected margin.

DETAILED DESCRIPTION

Figure 1:
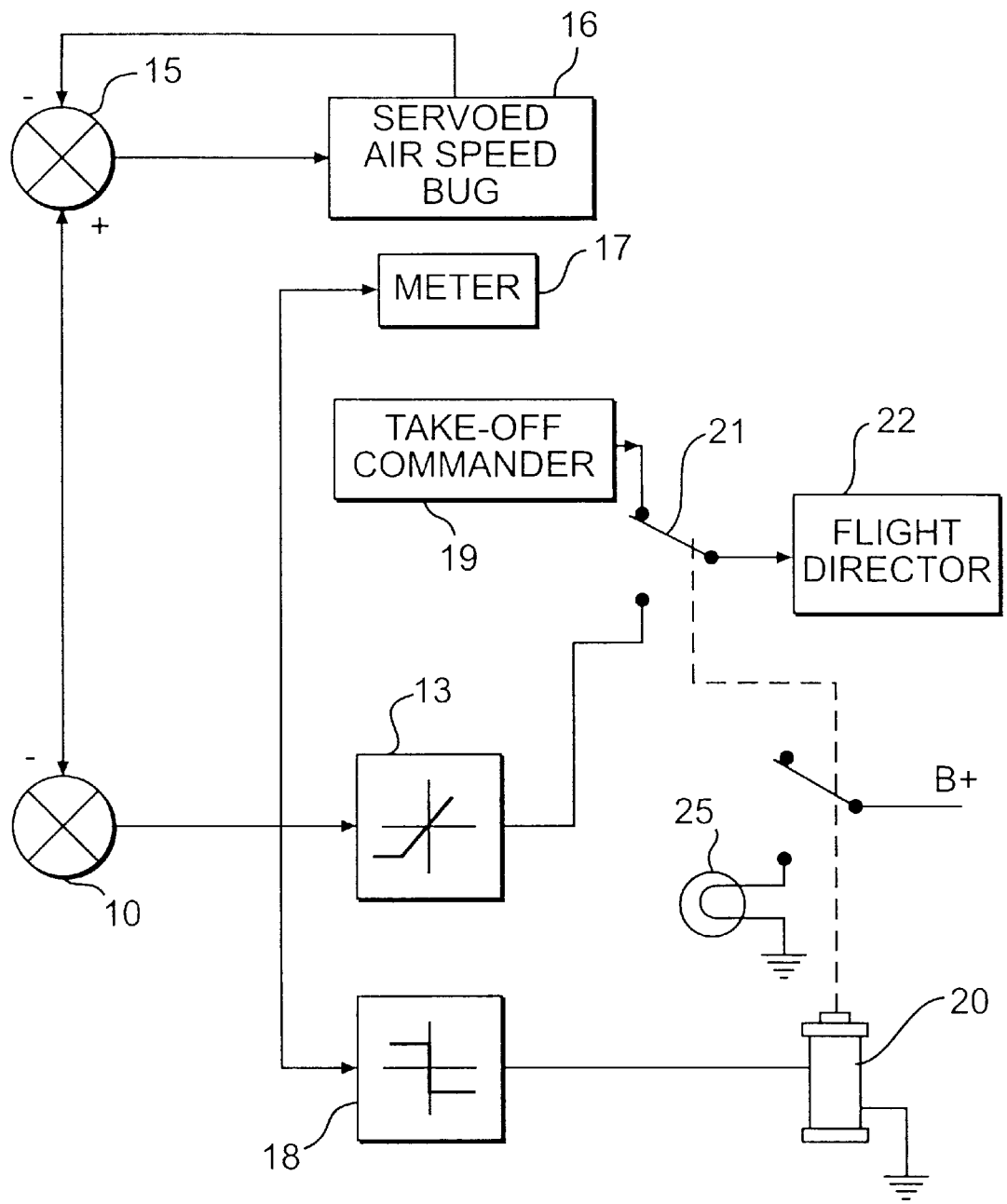
FIG. 1 is a functional block diagram of the invention.

Referring to FIG. 1, ambient air pressure sensor 1 senses the ambient air temperature and outputs the data to true/indicated speed conversion calculator 3. Ambient air temperature sensor 2 senses the ambient air temperature and outputs this data to true/indicated speed conversion coefficient calculator 3. Calculator 3, in turn, calculates the conversion coefficient between indicated air speed and true air speed for the ambient temperature and pressure. The conversion coefficient is input to multiplier 4. In an alternate embodiment, the pilot or some other person determines the appropriate conversion coefficient for the existing ambient air temperature and pressure from tables or graphs and then manually inputs this value into multiplier 4.

True ground speed sensor 5 senses the true ground speed of the airplane and outputs the true ground speed to multiplier 4. In a simple embodiment of the invention, the true ground speed is sensed by means of a sensor attached to one of the airplane wheels to sense the revolution rate of the wheel. In a more sophisticated embodiment of the invention, the true ground speed sensor consists of wheel revolution sensors attached to different wheels, the outputs of the two (or more) revolution sensors that agree most closely being averaged together to provide a measurement of the true ground speed. In an even more sophisticated embodiment, for which an indication of the longitudinal acceleration of the airplane is available, at higher grounds speeds, e.g. above 60 knots, the output of the ground speed sensor is based upon the outputs of the wheel revolution sensors until the ground speed exceeds some value such as 60 knots and then increases in ground speed above this value are based upon the longitudinal acceleration of the airplane. By using the longitudinal acceleration of the airplane to determine the ground speeds when the ground speed is in excess of some number such as 60 knots, one avoids the errors that otherwise may be introduced by slippage of the wheels at the higher grounds speeds. If sufficiently accurate, the indication of the longitudinal acceleration of the airplane, beginning at a ground speed of zero, can be used, by itself, to determine the ground speed of the aircraft. In whatever embodiment, true ground speed sensor 5 outputs a signal representing the true ground speed of the airplane.

By multiplying the true ground speed by the conversion coefficient appropriate for the ambient air temperature and pressure, multiplier 4 converts the true ground speed of the airplane into a value denoted herein as the "indicated ground speed" of the airplane. It should be apparent that the indicated ground speed is related to the true ground speed of the airplane in the same manner as the indicated air speed of the airplane is related to the true air speed of the airplane.

Referring again to FIG. 1, indicated air speed sensor 6 senses the indicated air speed of the airplane and outputs this value to summer 7 and to summer 8. By means of minimum air speed inputter 9, the pilot or other personnel inputs a preselected minimum value of indicated air speed at which one may safely initiate rotation of the airplane for take-off. Typically the pilot will take into account the air temperature and air pressure, the loaded weight of the aircraft and performance data for the aircraft to determine from tables and graphs the appropriate preselected safe minimum value of indicated air speed for initiating take-off rotation of the airplane.

Summer 8 subtracts the preselected minimum value of indicated air speed from the output of indicated air speed sensor 6 and outputs this difference to summer 10. Summer 7 subtracts the indicated ground speed that is output from multiplier 4 from the indicated air speed that is output from indicated air speed sensor 6 so as to obtain a value representing the "indicated" headwind experienced by the airplane. Here again, the "indicated" headwind is related to the true headwind by the coversion coefficient that relates indicated air speed to true airspeed. References in this disclosure to headwind, are intended to refer to the "indicated" headwind. Summer 7 also subtracts from the headwind a margin output from margin inputter 11 and outputs the value of the headwind less the margin to clipper 12. By means of margin inputter 11, the pilot or other personnel inputs an appropriate margin. Typically, the margin is fixed at a value of 10 or so knots. In some instances, it may be appropriate to set the value of the margin to zero, in which instances the margin inputter 11 may be either omitted or simply set to zero.

The output of summer 7 passes though clipper 12 which outputs the value of the headwind less the margin when this value is greater than zero and outputs zero when the headwind is less than the margin. This "clipped" value of headwind less the margin is subtracted in summer 10 from the output from summer 8, where the output from summer 8 represents the value of the indicated air speed less the safe minimum value of indicated air speed for take-off rotation. The output from summer 10 thus represents the indicated air speed minus the minimum air speed output from minimum air speed inputter 9 after adjustment by the excess, if any, of the headwind over the margin output by margin inputter 11. Thus, in effect, the minimum safe value of indicated air speed is adjusted upwards by the amount of the excess of the headwind above the preselected margin because the clipping effect provided by clipper 12 inhibits the adjustment of the minimum safe value of indicated air speed when the headwind is less than the preselected margin of 10 knots. When the margin is zero, in effect no margin is used and the minimum safe value of indicated air speed is adjusted upwards by the amount of the headwind.

At the beginning of the take-off roll, the output from summer 10 is a negative value, which value increases towards zero as the airplane accelerates and reaches the value of zero at the point when the indicated air speed equals the minimum air speed (for take-off rotation) after adjustment by the excess, if any, of the headwind over the margin output from margin inputter 11.

The output from summer 10 then passes through clipper 13 which provides an output equal to its input for inputs greater than a preselected, fixed negative value and provides an output equal to the fixed negative value for inputs that are more negative than the fixed negative value. Typically the preselected, fixed negative number represents a nose-down attitude of 10 or so degrees. The output from summer 10 is input to flight director 22 as a pitch command, thus providing direction to the pilot as to the proper pitch for the aircraft. As a consequence, at the beginning of the take-off roll, the flight director will display a pitch "command" of minus 10 degrees or so. As the airplane approaches the proper indicated airspeed for take-off rotation, the output from clipper 13, i.e. the pitch command, will increase towards zero, thus providing the pilot with an indication that the airplane is approaching the proper speed for take-off rotation.

The output from summer 10 also is input to switcher 18. When the input to switcher 18 is less than zero, switcher 18 outputs a fixed voltage to solenoid 20. When the input to switcher 18 is equal to or greater than zero, switcher 18 outputs zero voltage to solenoid 20. As a consequence, at the point in the take-off role when the airplane has reached the appropriate indicated airspeed for take-off rotation, the output from switcher 18 drops to zero, thus turning off solenoid 20 which causes switch 21 to switch the input to flight director from the output of clipper 13 and connects the input of the flight director to take-off commander 19. Take-off commander 19 inputs a fixed positive voltage into the flight director corresponding to a fixed, positive pitch (e.g. plus 10 degrees) that is appropriate for take-off.

As indicated in the "592" patent, the output from clipper 12 may be utilized in many different ways for the purpose of indicating that take-off rotation may be initiated. For instance, the output from clipper 12 can be added in summer 15 to the output from minimum air speed inputter 9 and the output from summer 15 then used to position a "servoed air speed bug" 16 so that the position of servoed air speed bug 16 on a display of indicated air speed would indicate the adjusted value of indicated air speed at which take-off rotation may be initiated. As also indicated in the "592" patent, the output from summer 10 may be utilized to operate meter 17 or monitor lamp 25 to indicate that safe take-off speeds have been reached or to provide take-off commands to a flight director in a different manner. Reference is made to the "592" patent for a more detailed description of these various means for indicating when take-off rotation may be initiated.

Figure 2:
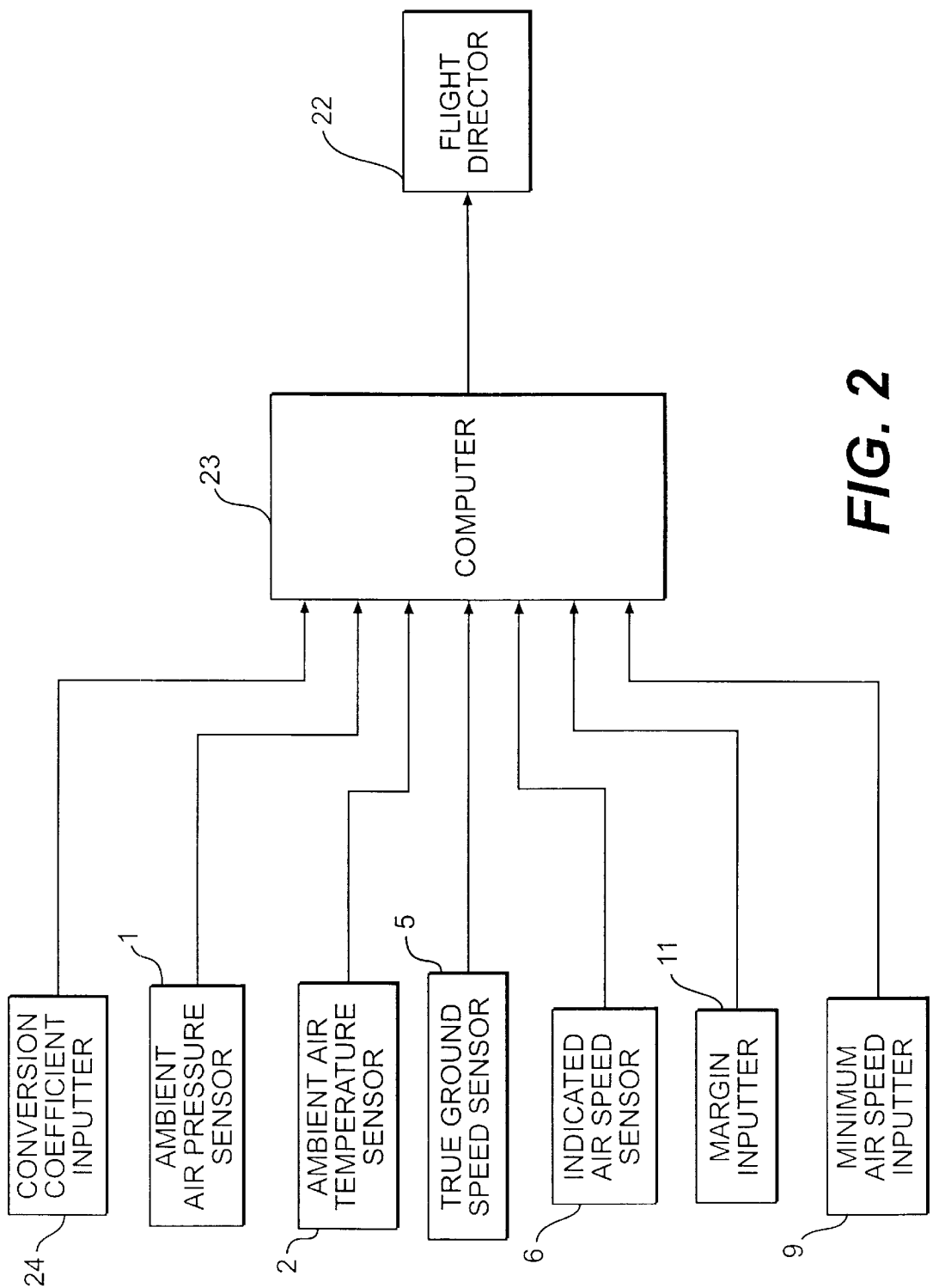
FIG. 2 is a block diagram depicting the preferred implementation of the invention utilizing a digital computer or microprocessor.

Another embodiment of the invention utilizes a computer to process the data output from the various sensors in order to provide an indication of when take-off rotation safely may be initiated. Referring now to FIG. 2. The outputs from ambient air pressure sensor 1, ambient air temperature sensor 2, true ground speed sensor 5, indicated air speed sensor 6, margin inputter 11 and minimum air speed inputter 9 are input to computer 23. Computer 23 then performs the mathematical calculations described in connection with FIG. 1 in order to provide an output in the form of a pitch command to the command flight director 22. By means of a look-up table or by use of mathematical equations, computer 23 calculates the conversion factor to convert true ground speed to indicated ground speed based upon the sensed values of ambient air pressure and temperature and multiplies the sensed true ground speed by the conversion factor to obtain the indicated ground speed. Computer 23 then calculates the amount of the headwind by subtracting the indicated ground speed from the indicated air speed. In a manner similar to that depicted in FIG. 1, computer 23 subtracts the preselected margin (e.g. 10 knots) from the calculated value of headwind and replaces any resulting negative values of the headwind less margin with zero.

Referring again to FIG. 2, instead of sensing the ambient air pressure and air pressure and calculating a conversion coefficient based upon these sensed values, the pilot or other personnel instead could input an appropriate value of the conversion coefficient to computer 23 by means of conversion coefficent inputter 24. Computer 23 would then use this manually input value of the conversion coefficient to convert the true ground speed of the airplane into an "indicated ground speed."

Computer 23 then outputs a pitch command "PITCH" given by:

$$\text{PITCH} = \text{GAIN} * (IAS\text{-}MAS\text{-}HWLM) \tag{1}$$

where the indicated air speed is denoted "IAS", the minimum air speed for take-off is denoted "MAS" and the value of the headwind less margin is denoted as "HWLM". HWLM in this equation is constrained to be zero if HWLM is less than zero. PITCH is also constrained to be equal to or greater than some minimum value, e.g. −10 degrees. GAIN is a multiplicative constant, typically of the order of 0.25 degrees of pitch per knot of speed. When PITCH is greater than or equal to zero, the value of PITCH output by the computer to the flight director is then set to some fixed, predetermined positive value corresponding to the appropriate positive attitude of the airplane for take-off.

I claim:

1. A device for indicating attainment of a minimum safe airplane speed for the initiation of airplane rotation for take-off into a headwind, said device being responsive to the indicated air speed of the airplane, the indicated air speed of the airplane being proportionately related to the true air speed of the airplane by a conversion coefficient, the conversion coefficient being a function of the ambient air temperature and pressure, said device comprising:

indicated air speed sensing means for sensing the indicated air speed of the airplane and outputting a signal responsive to the indicated air speed of the airplane, true ground speed sensing means for sensing the true ground speed of the airplane during the take-off roll of the airplane and outputting a signal responsive to the true ground speed of the airplane, conversion coefficient inputting means for inputting the conversion coefficient for converting true ground speed into indicated ground speed, ground speed converter means for converting the signal responsive to the true ground speed of the airplane into a signal representing a speed denoted as the indicated ground speed of the airplane, the indicated ground speed of the airplane being related to the true ground speed of the airplane by said conversion coefficient, headwind calculating means for calculating the amount of a headwind responsive to the difference between the indicated ground speed of the airplane and the indicated air speed of the airplane, minimum safe take-off indicated air speed inputting means for inputting a safe minimum take-off indicated air speed, adjusting means for determining an adjusted safe minimum take-off indicated air speed responsive to the safe minimum take-off indicated air speed and the amount of the headwind, safe take-off rotation indicating means for indicating when airplane rotation may be initiated for take-off, said safe take-off rotation indicating that airplane rotation may be initiated when the indicated air speed of the airplane equals or exceeds the adjusted safe minimum take-off indicated air speed.

2. A device for indicating attainment of a minimum safe airplane speed for the initiation of airplane rotation for take-off into a headwind, said device being responsive to the indicated air speed of the airplane, the indicated air speed of the airplane being proportionately related to the true air speed of the airplane by a conversion coefficient, the conversion coefficient being a function of the ambient air temperature and pressure, said device comprising:

indicated air speed sensing means for sensing the indicated air speed of the airplane and outputting a signal responsive to the indicated air speed of the airplane, true ground speed sensing means for sensing the true ground speed of the airplane during the take-off roll of the airplane and outputting a signal responsive to the true ground speed of the airplane, ambient air temperature sensing means for sensing the temperature of the ambient air of the airplane and outputting a signal responsive to the ambient air temperature, ambient air pressure sensing means for sensing the ambient air pressure of the airplane and outputting a signal responsive to the ambient air pressure, conversion coefficient generator means for generating a conversion coefficient responsive to the ambient air temperature and responsive to the ambient air pressure, which conversion coefficient is analogous to the conversion coefficient relating true air speed to indicated air speed, ground speed converter means for converting the signal responsive to the true ground speed of the airplane into a signal representing a speed denoted as the indicated ground speed of the airplane, the indicated ground speed of the airplane being related to the true ground speed of the airplane by said conversion coefficient, headwind calculating means for calculating the amount of a headwind responsive to the difference between the indicated ground speed of the airplane and the indicated air speed of the airplane, minimum safe take-off indicated air speed inputting means for inputting a safe minimum take-off indicated air speed, adjusting means for determining an adjusted safe minimum take-off indicated air speed responsive to the safe minimum take-off indicated air speed and the amount of the headwind, safe take-off rotation indicating means for indicating when airplane rotation may be initiated for take-off, said safe take-off rotation indicating that airplane rotation may be initiated when the indicated air speed of the airplane equals or exceeds the adjusted safe minimum take-off indicated air speed.

3. The device of claim 1 and additionally comprising speed margin inputting means for inputting a speed margin, the adjusting means for determining an adjusted safe minimum take-off indicated air speed being also responsive to the speed margin.

4. The device of claim 2 and additionally comprising speed margin inputting means for inputting a speed margin, the adjusting means for determining an adjusted safe minimum take-off indicated air speed being also responsive to the speed margin.

5. A device for indicating attainment of a minimum safe airplane speed for the initiation of airplane rotation for take-off into a headwind, said device being responsive to the indicated air speed of the airplane, the indicated air speed of the airplane being proportionately related to the true air speed of the airplane by a conversion coefficient, the conversion coefficient being a function of the ambient air temperature and pressure, said device comprising:

indicated air speed sensing means for sensing the indicated air speed of the airplane and outputting a signal responsive to the indicated air speed of the airplane, true ground speed sensing means for sensing the true ground speed of the airplane during the take-off roll of the airplane and outputting a signal responsive to the true ground speed of the airplane, conversion coefficient inputting means for inputting the conversion coefficient for converting true ground speed into indicated ground speed, ground speed converter means for converting the signal responsive to the true ground speed of the airplane into a signal representing a speed denoted as the indicated ground speed of the airplane, the indicated ground speed of the airplane being related to the true ground speed of the airplane by said conversion coefficient, speed margin inputting means for inputting a speed margin, minimum safe take-off indicated air speed inputting means for inputting a safe minimum take-off indicated air speed, safe take-off rotation indicating means for indicating when airplane rotation may be initiated for take-off, said safe take-off rotation indicating means subtracting the indicated ground speed from the indicated air speed to determine the amount of the headwind, subtracting the speed margin from the headwind, truncating to zero all values of the headwind less the margin that are less than zero, subtracting the truncated headwind less margin and the minimum safe take-off indicated air speed from the indicated air speed and indicating that rotation of the airplane may be initiated for take-off when the result equals or exceeds zero.

6. A device for indicating attainment of a minimum safe airplane speed for the initiation of airplane rotation for take-off into a headwind, said device being responsive to the indicated ground speed and the indicated air speed of the airplane, the indicated air speed of the airplane being proportionately related to the true air speed of the airplane by a conversion coefficient, the conversion coefficient being a function of the ambient air temperature and pressure, said device comprising:

indicated air speed sensing means for sensing the indicated air speed of the airplane and outputting a signal responsive to the indicated air speed of the airplane, true ground speed sensing means for sensing the true ground speed of the airplane during the take-off roll of the airplane and outputting a signal responsive to the true ground speed of the airplane, ambient air temperature sensing means for sensing the temperature of the ambient air of the airplane and outputting a signal responsive to the ambient air temperature, ambient air pressure sensing means for sensing the ambient air pressure of the airplane and outputting a signal responsive to the ambient air pressure, conversion coefficient generator means for generating a conversion coefficient responsive to the ambient air temperature and responsive to the ambient air pressure, which conversion coefficient is analogous to the conversion coefficient relating true air speed to indicated air speed, ground speed converter means for converting the signal responsive to the true ground speed of the airplane into a signal representing a speed denoted as the indicated ground speed of the airplane, the indicated ground speed of the airplane being related to the true ground speed of the airplane by said conversion coefficient, speed margin inputting means for inputting a speed margin, minimum safe take-off indicated air speed inputting means for inputting a safe minimum take-off indicated air speed, safe take-off rotation indicating means for indicating when airplane rotation may be initiated for take-off, said safe take-off rotation indicating means subtracting the indicated ground speed from the indicated air speed to determine the amount of the headwind, subtracting the speed margin from the headwind, truncating to zero all values of the headwind less the margin that are less than zero, subtracting the truncated headwind less margin and the minimum safe take-off indicated air speed from the indicated air speed and indicating that rotation of the airplane may be initiated for take-off when the result equals or exceeds zero.

7. A device for indicating attainment of a minimum safe airplane speed for the initiation of airplane rotation for take-off into a headwind, said device being responsive to the indicated air speed of the airplane, the indicated air speed of the airplane being proportionately related to the true air speed of the airplane by a conversion coefficient, the conversion coefficient being a function of the ambient air temperature and pressure, said device comprising:

an indicated air speed sensor, a true ground speed sensor, the true ground speed sensor outputting the true ground speed of the airplane, an ambient air temperature sensor, an ambient air pressure sensor, a conversion coefficient generator, the conversion coefficient generator generating a conversion coefficient responsive to the ambient air temperature and ambient air pressure, said conversion coefficient being analogous to the conversion coefficient between true air speed and indicated air speed, a true ground speed converter, the true ground speed multiplying the true ground speed of the airplane by the conversion coefficient to convert the true ground speed into an indicated ground speed for the airplane, a minimum safe take-off indicated air speed inputter, an appropriate preselected safe minimum air speed for the initiation of take-off rotation being input to the minimum safe take-off indicated air speed inputter, a safe take-off rotation calculator, a margin inputter for inputting a preselected margin:

the safe take-off rotation calculator subtracting the indicated ground speed of the airplane from the indicated air speed of the airplane to determine a value for the headwind experienced by the airplane, subtracting the preselected margin from the value of headwind and clipping negative values of the headwind, subtracting the clipped value of headwind from the indicated air speed less the preselected safe minimum air speed and outputting the result to indicate when take-off rotation may be initiated.

8. The device of claim 7 wherein the safe take-off rotation calculator further processes the output of the safe take-off rotation calculator as described in claim 9 by truncating to a predetermined threshold all values of the output that are more negative than the predetermined threshold and outputting this truncated output as a pitch command.

9. A device for indicating attainment of a minimum safe airplane speed for the initiation of airplane rotation for take-off into a headwind, said device being responsive to the indicated air speed of the airplane, the indicated air speed of the airplane being proportionately related to the true air speed of the airplane by a conversion coefficient, the conversion coefficient being a function of the ambient air temperature and pressure, said device comprising:

an indicated air speed sensor, a true ground speed sensor, the true ground speed sensor outputting the true ground speed of the airplane, an ambient air temperature sensor, an ambient air pressure sensor, a conversion coefficient generator, the conversion coefficient generator generating a conversion coefficient responsive to the ambient air temperature and ambient air pressure, said conversion coefficient being analogous to the conversion coefficient between true air speed and indicated air speed, a true ground speed converter, the true ground speed multiplying the true ground speed of the airplane by the conversion coefficient to convert the true ground speed into an indicated ground speed for the airplane, a speed margin inputter, an appropriate preselected margin being input to the speed margin inputter, a minimum safe take-off indicated air speed inputter, an appropriate preselected safe minimum air speed for the initiation of take-off rotation being input to the minimum safe take-off indicated air speed inputter, a safe take-off rotation calculator, the safe take-off rotation calculator subtracting the indicated ground speed of the airplane from the indicated air speed of the airplane to determine a value for the headwind experienced by the airplane, subtracting the preselected margin from the value of headwind and clipping negative values of the headwind less the preselected margin to zero, subtracting the clipped value of headwind less the preselected margin from the indicated air speed less the preselected safe minimum air speed and outputting the result to indicate when take-off rotation may be initiated.

10. The device of claim 9 wherein the safe take-off rotation calculator further processes the output of the safe take-off rotation calculator as described in claim 9 by truncating to a predetermined threshold all values of the output that are more negative than the predetermined threshold and outputting this truncated output as a pitch command.

11. A device for indicating attainment of a minimum safe airplane speed for the initiation of airplane rotation for take-off into a headwind, said device being responsive to the indicated air speed of the airplane, the indicated air speed of the airplane being proportionately related to the true air speed of the airplane by a conversion coefficient, the conversion coefficient being a function of the ambient air temperature and pressure, said device comprising:

an indicated air speed sensor, a true ground speed sensor, the true ground speed sensor outputting the true ground speed of the airplane, an ambient air temperature sensor, an ambient air pressure sensor, a conversion coefficient generator, the conversion coefficient generator generating a conversion coefficient generator responsive to the ambient air temperature and ambient air pressure, said conversion coefficient being analogous to the conversion coefficient between true air speed and indicated air speed, a multiplier, the multiplier multiplying the true ground speed of the airplane to obtain an indicated ground speed for the airplane, a speed margin inputter, an appropriate preselected margin being input to the speed margin inputter, a minimum safe take-off indicated air speed inputter, an appropriate preselected safe minimum air speed for the initiation of take-off rotation being input to the minimum safe take-off indicated air speed inputter, a first summer, the first summer subtracting the indicated ground speed of the airplane and the preselected speed margin from the indicated air speed of the airplane to determine the headwind experienced by the airplane less the preselected margin, a first clipper, the first clipper clipping the negative values for the headwind less the margin to zero, a second summer, the second summer subtracting the safe minimum air speed from the indicated air speed to obtain a relative air speed, a third summer, the third summer subtracting the clipped value of the headwind less the margin from the relative air speed to obtain a take-off indication signal, a second clipper, the second clipper clipping to a preselected threshold all values of the take-off indication signal that are more negative than the preselected threshold and outputting the clipped result, the clipped result indicating that rotation may be initiated when the clipped result is greater than the preselected threshold.

12. The device of claim 11 in which the value of the clipped result output from the second clipper constitutes a pitch command for the airplane.

* * * * *